United States Patent [19]

Dischert et al.

[11] 4,388,638

[45] Jun. 14, 1983

[54] DE-EMPHASIS FOR DIGITIZED COMPOSITE COLOR TELEVISION SIGNALS

[75] Inventors: Robert A. Dischert, Burlington; Glenn A. Reitmeier, Trenton, both of N.J.

[73] Assignee: RCA Corporation, New York, N.Y.

[21] Appl. No.: 226,387

[22] Filed: Jan. 19, 1981

[51] Int. Cl.$^3$ .............................................. H04N 9/535
[52] U.S. Cl. ........................................ 358/27; 358/13; 358/21 R
[58] Field of Search .................. 358/13, 21 R, 27, 36, 358/40

[56] References Cited

U.S. PATENT DOCUMENTS

| 4,261,009 | 4/1981 | Tomimoto et al. | 358/27 |
| 4,268,854 | 5/1981 | Ozawa. | |
| 4,316,213 | 2/1982 | Wharton et al. | 358/27 |

FOREIGN PATENT DOCUMENTS 1238918 7/1971 United Kingdom.

OTHER PUBLICATIONS

"Information Transmission, Modulation & Noise", Mischa Schwartz, McGraw-Hill Book Co., 1959, pp. 306 & 307.
"Digitals in Broadcasting", Harold E. Ennis, Howard W. Sams & Co., 1977, p. 269.
"PCM Encoded NTSC Color Television Subjective Tests", A. A. Goldberg, *Digital Video*, 1977, SMPTE, p. 21.

Primary Examiner—Richard Murray
Attorney, Agent, or Firm—Eugene M. Whitacre; Paul J. Rasmussen; William H. Meise

[57] ABSTRACT

In a standard NTSC composite video signal, the peak excursion of the luminance plus chrominance signal for certain saturated colors exceeds the peak excursion of the white-representative luminance alone. When digitized, the signal is subject to quantizing noise. The effective spectial distribution of the quantizing noise is improved by reducing the amplitude of the chrominance signal so that the peak excursion of luminance plus chrominance for saturated colors does not substantially exceed the peak amplitude of white-representative luminance.

4 Claims, 6 Drawing Figures

DE-EMPHASIS FOR DIGITIZED COMPOSITE COLOR TELEVISION SIGNALS

This invention relates to the transmission of composite color television signals in which the color signal components are de-emphasized or attenuated relative to the luminance signals.

As standardized, monochrome television signals are signals having an amplitude which is representative of the brightness in the actual scene being televised. With the advent of compatible color television, the color standard includes a high-frequency color subcarrier modulated with the color information which is superimposed upon the analog luminance signal. The color information is modulated onto the color subcarrier in a well-known fashion in which in the absence of a color signal (as for a white region of the picture) the color subcarrier is suppressed, so that only the luminance signal exists. When the picture contains color information, the amplitude of the modulated signal increases with increasing saturation and also increases with increasing brightness of the picture. Consequently, the maximum amplitude of the color-representative signal occurs when the brightness or luminance component is also a maximum. The magnitude or amplitude of the chrominance-representative signal is thus determined by the saturation of the color being represented and by the magnitude of the luminance signal. A predetermined amplitude ratio has been established for each color which represents the maximum amplitude ratio. For example, for a fully saturated red the amplitude of the chrominance signal is 2.1 times the magnitude of the luminance signal, and for yellow the ratio is 0.5 times the luminance.

The predetermined ratios were established based upon requirements of monochrome compatibility, the characteristic color response of the eye and the noise characteristics of analog transmission systems. Analog transmission systems generally include a "triangular" noise component which within a given bandwidth increases in amplitude with increasing frequency. Consequently, high-frequency signal components are subject to more noise than are low-frequency signal components. Thus, analog signal transmission systems often include means for "pre-emphasis" by which the amplitude of the high frequency components of the signal are increased relative to the amplitudes of the low-frequency components prior to passing signals through the transmission system. A corresponding de-emphasis at the receiving end of the transmission system restores the original amplitude-frequency response and at the same time attenuates the high-frequency noise introduced by the transmission system. Such pre-emphasis and de-emphasis is described for example at pages 306 and 307 of the text "Information Transmission, Modulation and Noise" by Mischa Schwartz published by McGraw Hill Book Company in 1959.

Digital transmission systems are essentially noise-free because regeneration of the transmitted pulses can be accomplished for all except the worst transmission conditions. If the basic information being transmitted is analog, it must be quantized before it can be passed through the digital system. The quantization or digitizing causes an error which gives rise to a wide-band noise. It is known to reduce the effects of quantizing error on an audio signal by pre-emphasis of the signal prior to quantizing and by de-emphasis prior to the following decoding, as described at page 269 of "Digitals in Broadcasting" by Harold E. Ennis published in 1977 Howard W. Sams And Company.

It is known that the presence of a color signal in the composite television signal being digitized acts as a dither which tends to subjectively improve the television picture, as described in the article "PCM Encoded NTSC Color Television Subjective Tests" by A. A. Goldberg which begins at page 21 of the book "Digital Video" published in March 1977 by the S.M.P.T.E. The dither reduces the apparent effect of quantizing errors on the signal.

Decoding of color information requires information derived from at least an entire subcarrier cycle. Each subcarrier cycle is ordinarily represented by two or more digital words, depending upon the sampling frequency. Consequently, the effects of quantizing noise on the chrominance signal are reduced by an averaging effect. Thus, the subjective signal-to-signal noise (S/N) of the color signal is better than might be expected based upon consideration only of the magnitude of the quantizing step. It is desirable to improve the apparent signal-to-noise ratio at the output of a digital system.

SUMMARY OF THE INVENTION

An improved arrangement for digitizing signals from a source of composite analog video signals representing color image includes a digitizer for digitizing composite analog signals into a predetermined number of bits. The composite analog signals are composed of a luminance component which has in the case of white-representative signal a predetermined maximum level. A chrominance component modulated onto a subcarrier is superimposed upon the luminance component. The chrominance-modulated subcarrier has a value or amplitude for certain colors such that the composite signal exceeds the predetermined level. The digitizing operation introduces broadhand quantizing noise which depends in part upon the amplitude of the signal being digitized. When the amplitude of the composite signal is selected to use all the available quantizing levels, the amplitude of the white-representative luminance component is represented by less than the predetermined number of bits and is therefore subject to increased broadband noise. According to the improvement, the composite signals are coupled to the digitizer through an attenuator for attenuating the chrominance component relative to the luminance component for decreasing the broadband noise affecting the luminance component.

DESCRIPTION OF THE INVENTION

Figure 1A:
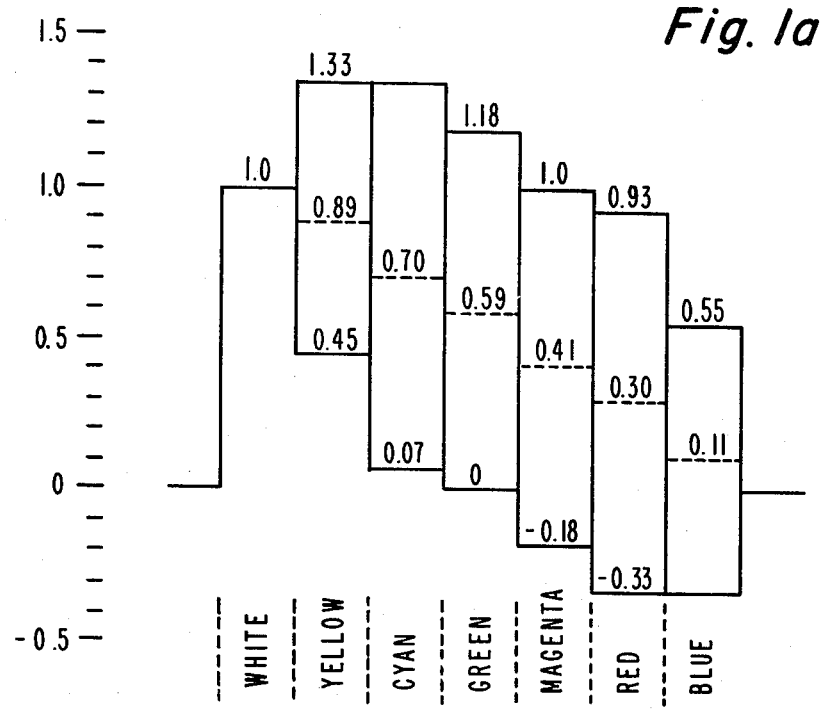
FIGS. 1a, 1b and 1c include plots of voltage versus time of composite signals representing a color image.

FIG. 1A represents a voltage-time plot of a multiburst signal selected to provide steps of successively decreasing luminance value. The luminance value of the signal in the case of FIG. 1A is a stairstep signal having a peak amplitude of 1.0 for a white-representative signal and extending successively to a value of 0.11 for a blue-representative signal. At the left of FIG. 1A, the luminance component has a maximum value of 1.0, representing one hundred IRE units. This portion of the signal represents the brightest possible white signal. The next adjacent portion includes a luminance component of 0.89 (89 IRE units) upon which is superimposed a yellow-representative chrominance component having a peak amplitude of 0.44. In order to simplify FIG. 1, only the envelope of the high-frequency chrominance signal is illustrated. The peak value of the composite signal is ⅓ larger than the peak value of the white-representative luminance signal. Consequently, the peak value of the composite signal in the case of a maximum saturation yellow signal extends to 1.33. Similarly, for the case of a full-saturation cyan signal the luminance or brightness component has a magnitude of 0.7 and the chrominance component has a peak-to-peak (P-P) value of 0.63, so the peak value of the composite signal is 1.33, as in the case of the yellow signal. A green representative signal as illustrated has a luminance component of 0.59 and the peak excursions of the chrominance component which extend to 1.18. Thus, the green-representative signal has a peak-value 18% greater than the peak value of a white-representative signal. Magenta is also 18% greater but the peak excursion is in the opposite direction. For the red and blue-representative signals the composite signal has peak values extending to −0.33, and thus the peak value is ⅓ larger than the value of a white-representative signal.

When a composite color signal is to be digitized, the signal is applied to an analog-to-digital converter (ADC). In the ADC, the applied composite signal is periodically compared with a predetermined number of reference voltages representing the quantizing levels and a digital word is generated representing the quantizing level most closely approximately the applied signal. It will be clear that if the peak value of the applied signal is too small, some of the predetermined quantizing levels will never be utilized as digital words. Also, if the peaks of the applied composite signal exceed the value of the highest quantizing level the digital word representing that highest quantizing level will necessarily be used to represent all higher values of the applied signals. This results in gross distortion, while failure to use all available quantizing levels results in increased levels of quantizing noise.

The P-P value of the signal of FIG. 1A is 1.66. If a predetermined number of quantizing levels is used (for example, 256 levels representing 8-bit quantization) and the signal is manually or automatically adjusted to just fill the available number of quantizing levels, then the luminance component of the signal will be represented by approximately 154 quantizing levels rather than by 256 quantizing levels. Consequently, the luminance component of the signal is represented by fewer quantizing steps and will be subject to a broadband noise. This broadband noise gives rise to a graininess of the image and in severe cases can result in "contouring".

Figure 1B:
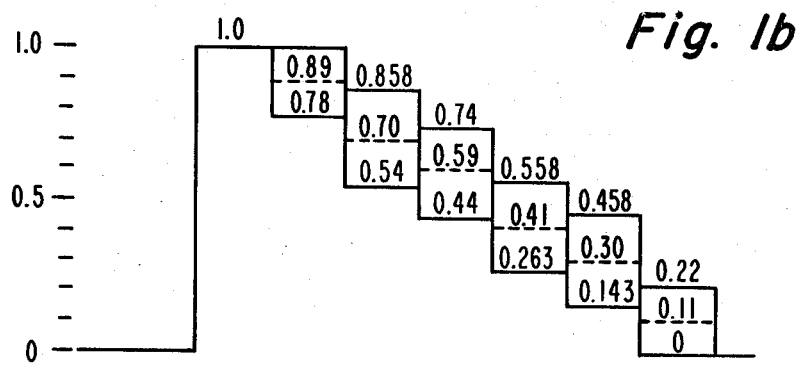

FIG. 1B represents a composite color signal similar to that of FIG. 1A in which the amplitude of the chrominance component has been reduced to ¼ of its previous amplitude. The white-representative luminance signal remains unchanged at an amplitude of 1.0. The yellow-representative chrominance signal, however, has its peak excursion reduced from 0.44 to 0.44/4, which equals 0.11. Consequently, the peak excursion of the yellow representative composite signal is the luminance component 0.89 plus the 0.11 peak excursion of the chrominance component for a total value of 1.0.

Figure 1C:
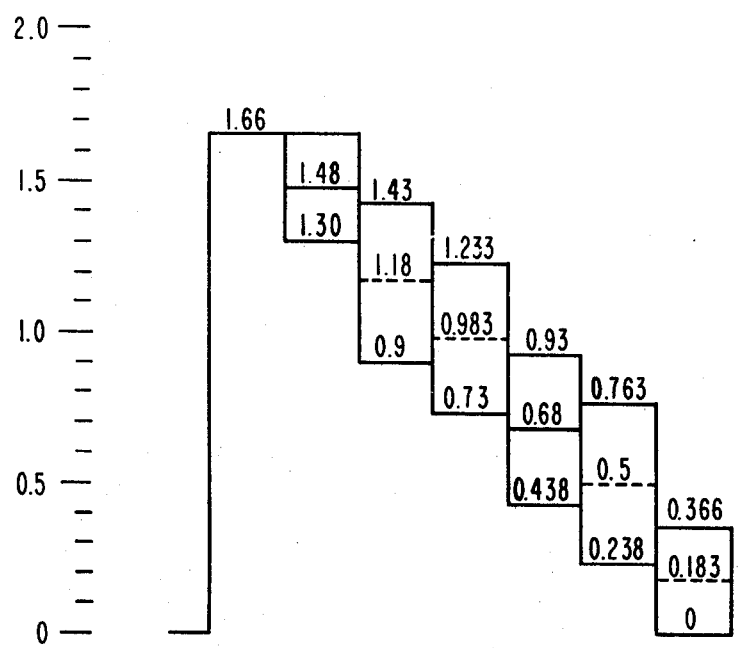

In a similar fashion the peak excursion of the chrominance component for the various colors illustrated in FIG. 1B do not exceed the peak value of luminance-representative component. Consequently, in order to digitize the signal FIG. 1B, the same 256 quantizing levels are available as were available for the signal of FIG. 1A but the magnitude of the signal is smaller. Naturally the entire signal of FIG. 1B can be increased in magnitude before being digitized so as to have the same P-P value as does the signal of FIG. 1A. FIG. 1C represents the signal of FIG. 1B increased in amplitude by 1.66:1 so as to equal the P-P value of the signal of FIG. 1A. When quantized, the white-representative portion in FIG. 1C can be quantized by the entire predetermined number of quantizing levels available, which in a 8-bit quantizing of the example is 256 levels. Consequently, the broadband quantizing noise affecting the lower-frequency luminance component of the composite signal is reduced. It should be understood that the noise for the luminance components of color representative signals is also reduced. The quantizing noise affecting the higher-frequency chrominance component is increased. Thus, the effect of the change of reapportionment in amplitudes is a shift in the effective noise spectrum so as to reduce low-frequency noise and increase high-frequency noise. In a television context, this is a desirable tradeoff because as mentioned the high-frequency noise is subjectively less apparent.

Figure 2:
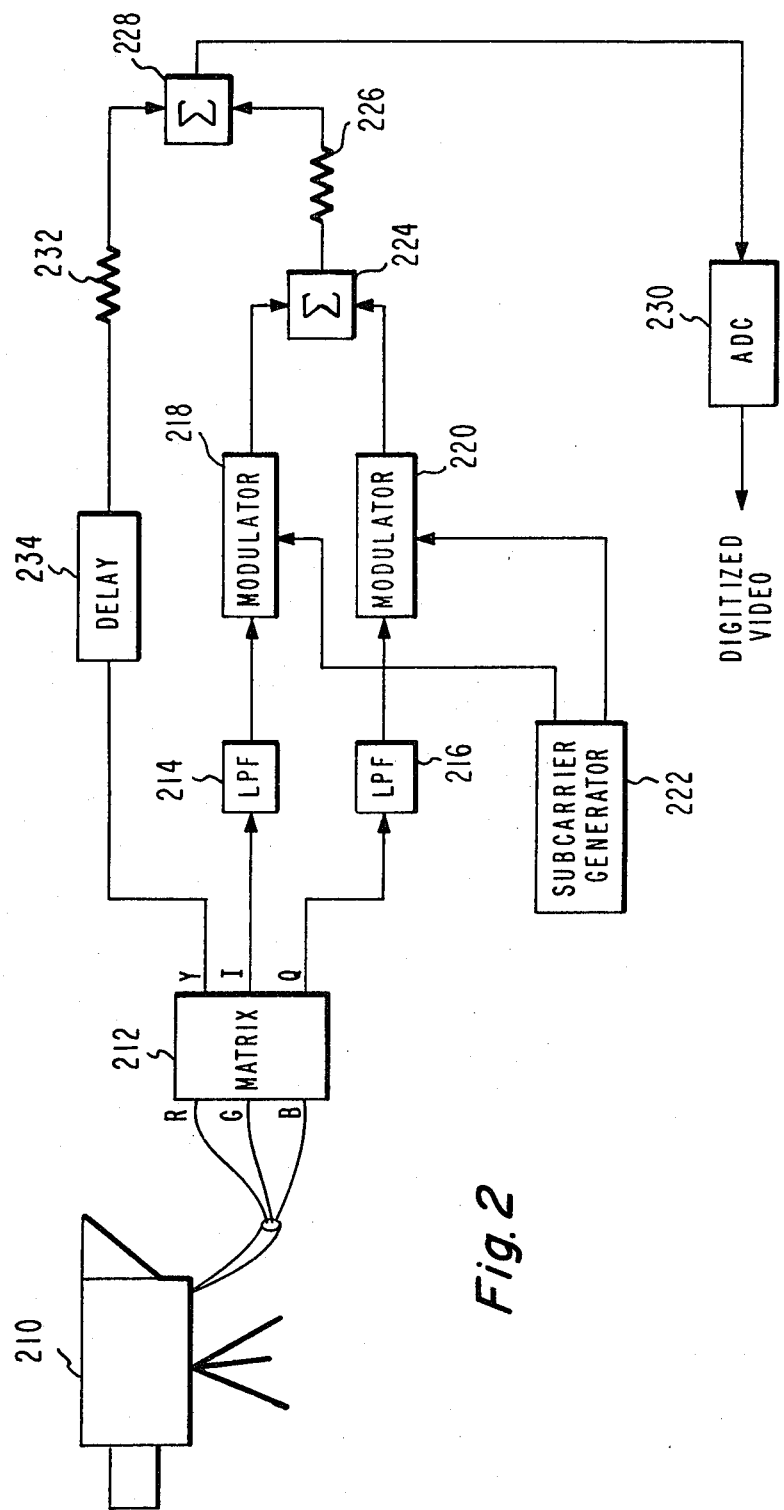
FIG. 2 is a block diagram of an encoder for a digital transmission system according to the invention.

In FIG. 2 a color television camera illustrated as 210 produces separate red (R), green (G) and blue (B) signals which are applied to a matrix 212. As is known, matrix 212 produces a broadband luminance (Y) signal according to the equation:

$$E_y = 0.30\ E_R + 0.59 E_G + 0.11 E_B.$$

Matrix 212 also produces I and Q signals from R, G and B signals according to the equations:

$$E_I = 0.60 E_R - 0.28 E_G - 0.32 E_B \text{ and}$$

$$E_Q = 0.21 E_R - 0.52 E_G + 0.31 E_B.$$

The I signal is applied to a lowpass filter 214 to limit the bandwidth to 1.5 MHz, and the Q signal is applied to a lowpass filter 260 to limit its bandwidth to 0.5 MHz. The band-limited I and Q signals are applied to the inputs of modulators 218 and 220, respectively. Also applied to modulators 218 and 220 are signals from a subcarrier generator 222. The signals from modulators 218 and 220 are summed in a summing circuit 224 to produce a signal represented by $E_I \cos(wt + 33°) + E_Q \sin(wt + 33°)$. This signal is applied through a resistor 226 to a further summing circuit 228. The Y signal is applied through a delay circuit represented as a block 230 and through a resistor 232 to another input summing circuit 228. Delay 234 is selected to delay the Y signal by an amount equal to the delay experienced by the chrominance signals, which is chiefly caused by lowpass filters 214 and 216. In the prior art, resistors 226 and 232 have values selected to produce a composite signal $E_C$ according to the equation:

$$E_C = E_Y + [E_I \cos(wt + 33°) + E_Q \sin(wt + 33°)]$$

to produce a signal proportioned as shown in FIG. 1A. However, according to the invention, the value of resistor 226 is increased by a factor of four so as to reduce the magnitude of the chrominance signal components being summed with the luminance component to produce a signal proportioned as illustrated in FIG. 1B.

The composite chrominance signal produced in summing circuit 228 is applied to an ADC 230 to produce digitized video which may be passed through a digital circuit as a single multiplexed channel or as a plurality (for example, 8) of parallel or simultaneous channels.

Figure 3:
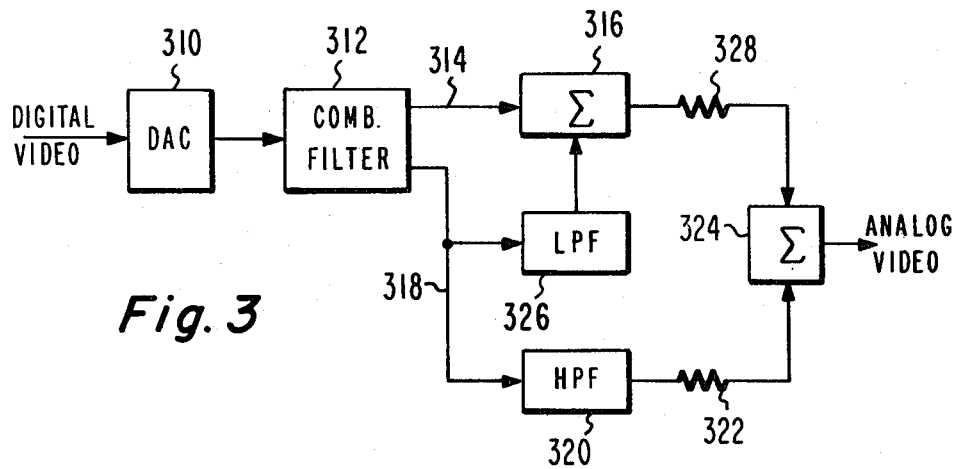
FIG. 3 is a block diagram representing a decoder which may be used with either of the encoders of FIG. 2 or 4.

FIG. 3 illustrates a decoder which may be used in conjunction with the encoder of FIG. 2. Digital video from an encoder is applied to digital-to-analog converter (DAC) 310 which converts the digital signal to a composite analog signal. The composite analog signal is applied to a comb filter 312 of known type for separating chrominance information from luminance information. The luminance information is applied over a conductor 314 to a summing circuit 316. The chrominance information, together with certain residual components of the luminance information, appears on conductor 318. The chrominance information is passed through a high pass filter (HPF) 320 and a resistor 322 to one input of a summing circuit 324. The low-frequency components of the luminance residue are passed through a low pass filter (LPF) 326 and summed in summing circuit 316 with the luminance signal on conductor 314 to produce an improved luminance signal which is applied by way of a resistor 328 to summing circuit 324. The amplitude of the chrominance signal at the output of HPF 320 compared with the amplitude of the luminance signal at the output of summing circuit 316 is 12 db lower than the amplitude of the chrominance at the output of summing circuit 224 compared with the amplitude of the luminance at the output of delay circuit 230 in FIG. 2. In other words, the chrominance and luminance signals applied to resistors 322 and 328 are proportioned as illustrated in FIGS. 1B and 1C, while the chrominance and luminance signals applied to resistors 226 and 232, respectively, of FIG. 2, are proportioned as in FIG. 1A. Resistor 328 of FIG. 3, however, has a resistance value four times that of resistor 322, and as a result, the analog video produced at the output of summing circuit 324 has the luminance attenuated with respect to the chrominance by a factor of four times. This restores the relative amplitudes of luminance and chrominance to those shown in FIG. 1A. Thus, the arrangement of the encoder of FIG. 2 and the decoder of FIG. 3 coupled to the ends of the digital transmission path (not shown) allow transmission of composite color-representative signals over a digital signal path having a predetermined number of digitizing levels with reduced visibility of noise. The reduced visibility of the noise results from the redistribution of the noise spectrum, which in turn results from the selection of the ratio of the amplitudes of the chrominance and luminance so as not to substantially exceed the peak value of the white-representative luminance or other peak value of luminance alone.

Figure 4:
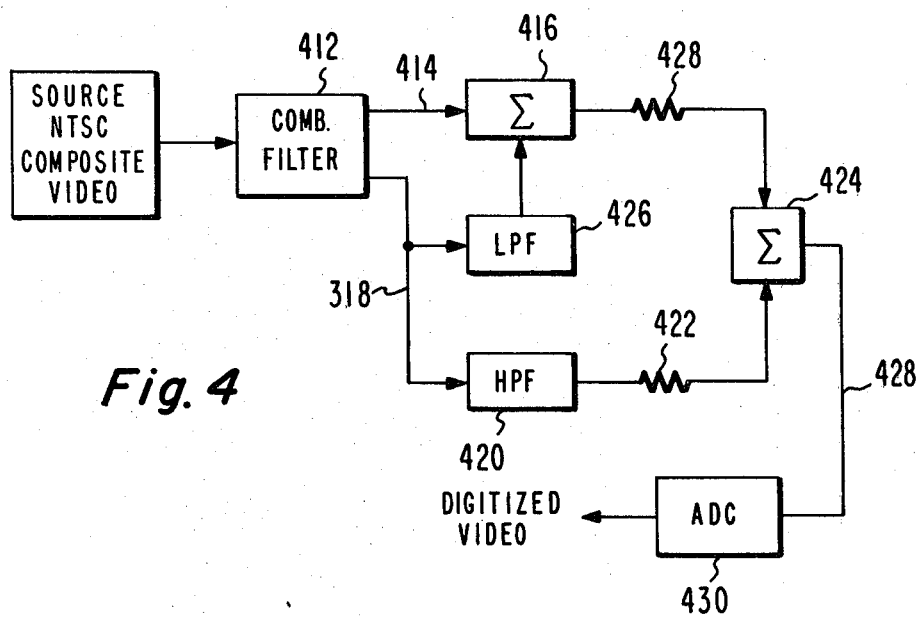
FIG. 4 illustrates an encoder for signals from a source of NTSC-standard composite signals.

FIG. 4 illustrates an encoder for signals from a source of NTSC-standard composite video. The NTSC composite video is proportioned as in FIG. 1A, with the peak amplitude of the composite signal substantially exceeding the peak amplitude of the white-representative luminance alone. In order to reduce the amplitude of the chrominance signal relative to the luminance signal, an arrangement similar to that of the decoder of FIG. 3 is used in the encoder of FIG. 4. The NTSC video is applied to a comb filter 412 for separation into a luminance component which is applied over a conductor 414 to a summing circuit 416. The chrominance component and a residue of luminance appears on conductor 318, and the low-frequency portion of the residue is applied to summing circuit 416 by way of a low pass filter 426. The chrominance portion is applied through a high pass filter 420 and a resistor 422 to a summing circuit 424 where it is combined with luminance applied through a resistor 428. Unlike the arrangement of FIG. 3, resistor 422 has an amplitude four times that of resistor 428, which attenuates the chrominance component of the composite analog video signal appearing on a conductor 428 and applied to ADC 430 for quantization. In this way, NTSC video is rearranged to the proportions shown in FIGS. 1B and 1C, whereby the quantization noise of the digitized signal is reduced. It will be apparent to those skilled in the art that signals according to the various PAL standards may be digitized with reduced chroma levels to achieve the same advantages as in the case of NTSC signals.

What is claimed is:

1. A method for generating a digital signal representative of a composite color television signal, the method comprising:

generating a luminance signal component having a predetermined value when representing a white image;

generating a chrominance signal component having a value such that when combined with the value of said luminance signal the peak value of the combined signal for any saturated color of the image does not exceed said predetermined value; and combining said luminance and chrominance signal components.

2. An improved arrangement for digitizing signals from a source of composite analog video signals representing a color image, said composite signals being composed of a luminance component having a predetermined maximum level in the case of a white-representative signal, upon which is superimposed a chrominance component modulated onto a subcarrier, said chrominance-modulated subcarrier having a value for certain colors such that said composite signal exceeds said predetermined level, said arrangement comprising:

means for digitizing composite analog signals into a predetermined number of bits, said digitizing operation introducing broadband quantizing noise which depends upon the amplitude of the signal being digitized;

and coupling means for coupling said composite signals from said source of composite signals to said digitizing means with an amplitude such that said composite signal is represented by substantially said predetermined number of bits, whereby the amplitude of said white-representative luminance component may be digitized by less than said predetermined number of bits and is therefore subject to said broadband noise, wherein the improvement lies in that said coupling means comprises means for attenuating said chrominance component relative to said luminance component for decreasing said broadband noise to which said luminance component is subject.

3. A method for representing a color television signal in digital form, wherein said color television signal includes a luminance-representative signal and a chrominance-representative signal, comprising the steps of:

combining said chrominance-representative signal with said luminance-representative signal to form a composite signal in which the peak value of the composite signal thus formed for any saturation of any hue to be represented does not substantially exceed the peak value of said luminance-representative signal; and digitizing said composite signal.

4. A method according to claim 3, wherein said peak value of said composite signal substantially equals said peak value of said luminance-representative signal.

* * * * *